July 29, 1952     F. G. GISE     2,604,679

CHAIN FASTENER

Filed Jan. 24, 1951

INVENTOR.
FRANK GEIMAN GISE
BY *Archworth Martin*
Attorney

Patented July 29, 1952

2,604,679

UNITED STATES PATENT OFFICE 2,604,679

CHAIN FASTENER

Frank Geiman Gise, York, Pa., assignor to The McKay Company, Pittsburgh, Pa., a corporation of Pennsylvania Application January 24, 1951, Serial No. 207,579

2 Claims. (Cl. 24—69)

My invention relates to chain fasteners, and more particularly to tightening and connecting devices such as are employed in fastening the side chains of anti-skid chain structures that are employed on automobile wheels, but it is capable of use in other relations.

One object of my invention is to provide a fastener of the type referred to that is particularly suitable for heavy duty chains and which has greater strength for a given size and amount of material than some other types of fasteners.

Another object of my invention is to provide a fastener of the type referred to which although it has great holding strength will require less room or space for operation thereof than do fasteners of other types having comparable strength.

Figure 1:
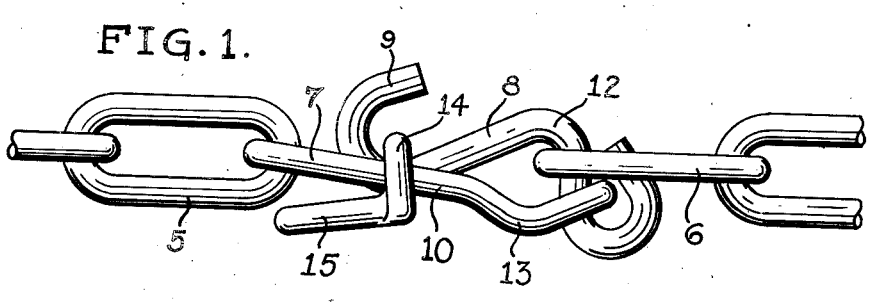
Figure 2:
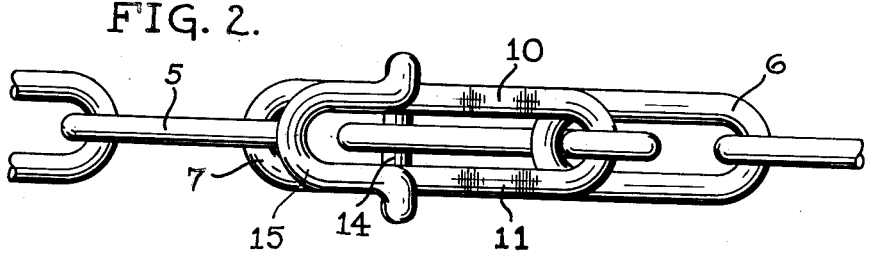
Figure 3:
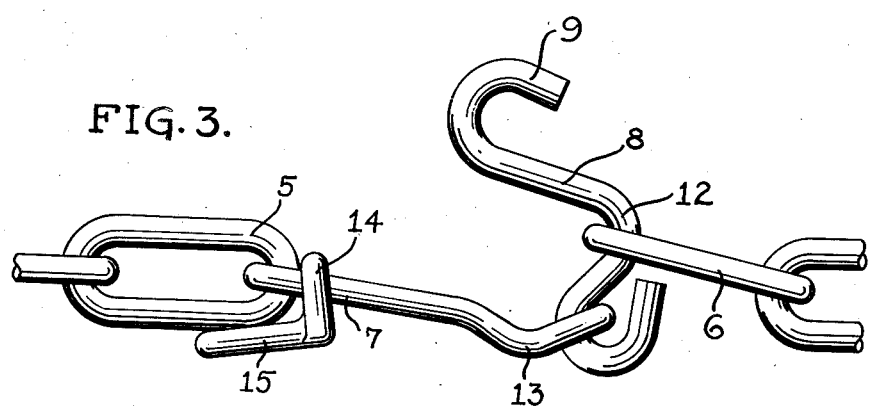
Figure 4:
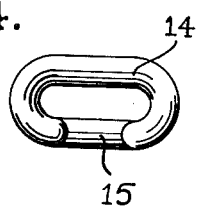

In the accompanying drawing, Figure 1 is a side elevational view showing a fastener applied to links which are releasably connected thereby; Fig. 2 is a bottom plan view of the structure of Fig. 1; Fig. 3 is a view similar to Fig. 1, but showing the latching lever in release position, and Fig. 4 is an end view of the keeper for the latch lever.

In the accompanying drawing, the links 5 and 6 may be representative of the end links of side chains for heavy duty anti-skid devices or chains such as those used on commercial vehicles or military trucks. A connector link 7 of elongated loop form is permanently connected at one end to the link 5 and at its other end has a latch lever 8 pivotally connected thereto, the latch lever being movable into and out of the other link 6 when connecting and disconnecting the two chain ends.

The lever 8 has its one end back-turned to form a hook 9 and is movable into position between the side bar portions 10 and 11 of the connecting link 7. The lever and the side bars are shown as having oppositely-offset portions 12 and 13 respectively, to provide a seat for the link 6. While it is not essential that both these parts be offset, there is less protuberance or overall dimension required than if the required offset were provided entirely only at 12 or at 13.

A keeper 14 is slidably supported on the side bars 10 and 11, overlying the outer face of the link 7 and extending approximately half-way around the side bars 10 and 11, to the rear faces thereof. These semi-circular portions are extended forwardly beneath the side bars, to form a yoke-like portion 15.

With the parts in the position shown in Fig. 1, depression of the lever 8 for a sufficient distance will cause it to be moved into and partly through the connector link 7 such distance as to permit sliding of the keeper 14 to the left, past the hook, so that the lever can be swung outwardly past the position shown in Fig. 3, preliminary to withdrawal thereof from the link 6. The yoke-like extension serves as a tie member for the inwardly-bent portions of the keeper to thereby strengthen the keeper, and, owing to its shape, permits the hook portion of the lever to be pushed inwardly a sufficient distance to release it from or effect engagement with the outer portion of the keeper. Also, it is not necessary to push the hook 9 farther into the link than the plane between the side bars 10—11. In other words, it does not have to be pushed as far inwardly as would be the case if the keeper were simply looped around the outer and rear sides of the link 7 in a single transverse plane, and therefore the device can be manipulated more freely when applying the chain to or removing it from the side of a wheel or tire, since the rear side of the fastener is usually in proximity to the tire or wheel.

The keeper 14 can, of course, be made in any suitable manner, as by forging, casting or stamping.

I claim as my invention:

1. A chain fastener comprising a connecting link of elongated loop form, a fastener lever pivoted at one end to the rear end of the link and having an outwardly bent hook on its other end, the lever being movable between the side bars of the link, and a keeper of unbroken loop form slidable on the side bars, into and out of hook-engaging position, the keeper overlying the outer faces of the side bar portions and extending approximately half-way around each side bar, the rear portions of the keeper being extended in yoke-like form toward the forward end of the connector link, with the legs of the yoke underlying adjacent portions of the side bars, whereby the hook portion of the lever may be moved into the space between the side bars, for slidable movement of the keeper into and out of hook-engaging position.

2. A chain fastener comprising a connecting link of elongated loop form, a fastener lever pivoted at one end to the rear end of the link and having an outwardly bent hook on its other end, the lever being movable between the side bars of the link, and a keeper of unbroken loop form slidable on the side bars, into and out of hook-engaging position, the keeper overlying the outer faces of the side bar portions and extending approximately half-way around each side bar, the rear portions of the keeper being extended in yoke-like form toward the forward end of the connector link, with the legs of the yoke underlying adjacent portions of the side bars, whereby the hook portion of the lever may be moved into the space between the side bars, for slidable movement of the keeper into and out of hook-engaging position, the link and the lever having oppositely-disposed depressions near the rear end of the link, to detachably receive a chain link.

FRANK GEIMAN GISE.

REFERENCES CITED

The following references are of record in the file of this patent:

UNITED STATES PATENTS

| Number | Name | Date |
| --- | --- | --- |
| 1,761,648 | Thomas | June 30, 1930 |